(12) United States Patent
Butcher (10) Patent No.: US 11,003,938 B2
(45) Date of Patent: May 11, 2021

(54) IMAGE-BASED ASSOCIATION OF TRACKING DEVICE AND TRACKED ASSET FOR DETERMINING A LINK BETWEEN THE TRACKING DEVICE AND THE TRACKED ASSET

(71) Applicant: Verizon Patent and Licensing Inc., Arlington, VA (US)

(72) Inventor: Nicholas D. Butcher, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 16/201,314

(22) Filed: Nov. 27, 2018

(65) Prior Publication Data

US 2020/0167585 A1 May 28, 2020

(51) Int. Cl.
*G06K 9/00* (2006.01)
*G06K 9/20* (2006.01)
*G06K 19/06* (2006.01)
*G06K 7/10* (2006.01)

(52) U.S. Cl.
CPC ....... *G06K 9/2063* (2013.01); *G06K 7/10722* (2013.01); *G06K 9/00624* (2013.01); *G06K 19/06028* (2013.01); *G06K 19/06037* (2013.01); *G06K 2209/01* (2013.01)

(58) Field of Classification Search
CPC ............ G06K 9/2063; G06K 7/10722; G06K 9/00624; G06K 19/06028; G06K 19/06037; G06K 2209/01
See application file for complete search history.

(56) References Cited

U.S. PATENT DOCUMENTS

| 2015/0049238 A1* | 2/2015 | Daon | H04N 5/2224 348/349 |
| 2019/0332880 A1* | 10/2019 | Benge | G06K 9/2063 |
| 2020/0104591 A1* | 4/2020 | Zucker | G06K 9/00201 |

* cited by examiner

*Primary Examiner* — Pakee Fang (57) ABSTRACT

A device can identify a tracking device; identify, in an image or video and using a computer vision technique, a tracked asset or an identifier associated with the tracked asset, wherein the tracking device is to be used to track a location of the tracked asset; determine information identifying an association between the tracking device and the tracked asset based on identifying the tracking device and identifying, in the image or video and using the computer vision technique, the tracked asset or the identifier associated with the tracked asset; determine a link between the tracking device and the tracked asset based on the information identifying the association between the tracking device and the tracked asset; and store or provide link information that identifies the link between the tracking device and the tracked asset to track the location of the tracked asset using the tracking device.

20 Claims, 5 Drawing Sheets

IMAGE-BASED ASSOCIATION OF TRACKING DEVICE AND TRACKED ASSET FOR DETERMINING A LINK BETWEEN THE TRACKING DEVICE AND THE TRACKED ASSET

BACKGROUND

A tracking device can be used to determine a location or other information regarding a tracked asset. For example, a tracking device can include a near-field communication (NFC) tag, a Global Positioning System (GPS)-based tracking device, a Bluetooth-based tracking device, and/or the like. A tracked asset can include any object that is to be tracked, such as a tool, a vehicle, a worker, an animal, an unmanned aerial vehicle (UAV), store inventory, and/or the like.

DETAILED DESCRIPTION OF PREFERRED EMBODIMENTS

The following detailed description of example implementations refers to the accompanying drawings. The same reference numbers in different drawings can identify the same or similar elements.

A tracking device can be used to track a tracked asset for various purposes, such as determining a location of the tracked asset, maintaining records regarding usage of the tracked asset, checking out or returning the tracked asset, determining information regarding a location or usage of the tracked asset, determining environmental conditions at a location of the tracked asset, and/or the like. A device can store information identifying links between tracking devices and tracked assets. A link can indicate that a tracking device is affixed to a tracked asset, so that location data regarding the tracking device can be used to track the tracked asset. The device can receive a user input identifying a link, and can store link information identifying the link. As another example, the device can identify the tracking device (e.g., using a pairing technique, a bind technique, and/or the like), and can receive an input (e.g., a user input) identifying a tracked asset to be paired with the tracking device. Thus, the device can identify links between tracking devices and tracked assets. Subsequently, the device can identify a location of a tracking device (e.g., using a sensor of the device, using GPS information provided by the tracking device, etc.) and can accordingly determine the location of the tracked asset.

Link information might not always be reliable. As one example, an error in link information can be caused by a user neglecting to provide information identifying a link between a tracked asset and a tracking device. As a second example, link information can be incomplete, for example, when a user fails to enter complete information to identify a tracked asset (e.g., a user can enter "cordless drill" rather than a serial number of the cordless drill, or can enter an inaccurate serial number). As a third example, link information can identify an incorrect link. For example, if a first tracking device is to be linked with a tracked asset, but a second tracking device is nearer to a device that is to determine the link information, the device can erroneously identify the second tracking device as linked with the tracked asset, based on pairing with the second tracking device instead of the first tracking device.

Furthermore, the act of linking tracking devices and tracked assets is associated with overhead (e.g., time associated with entering information identifying a link, time and/or processor resources associated with pairing with a tracking device, time associated with correcting erroneous link information, processor resources associated with providing an interface for entering information identifying a link, etc.). This overhead can be particularly cumbersome or inefficient when many links are to be determined or when the value of a set of tracked assets is low.

Some implementations described herein provide determination of link information using an image or video of a tracked asset. For example, some implementations described herein can identify a tracked asset and a tracking device in an image or video using a computer vision technique, and can determine an association between the tracked asset and the tracking device based on identifying the tracked asset and the tracking device in the image or video. As another example, some implementations described herein can determine link information based on the aforementioned association (e.g., based on identifying many associations between a tracked asset and a tracking device, based on identifying an association with a threshold level of confidence, etc.). As yet another example, some implementations described herein can determine that existing link information is likely erroneous based on an identified association, and can correct the existing link information or provide a notification regarding the existing link information.

In this way, the accuracy of link information can be improved, since it can be more readily apparent that a tracked asset and a tracking device are to be linked when both are visible in the same image or video than when the tracking device must be identified via pairing and a tracked asset's serial number must be manually entered. Furthermore, overhead associated with linking tracking devices and tracked assets can be reduced in comparison to manual or user input of information identifying a tracking device and/or a tracked asset. Still further, by automatically identifying and correcting erroneous link information, the accuracy of a link information database can be improved, and user input associated with correcting erroneous link information can be reduced in comparison to a manually-maintained link information database.

In many of the implementations described herein, the tracking device is used to track a location of the tracked asset. However, the implementations described herein are not limited to those involving location tracking using the tracking device. As just a few examples, the tracking information may be used to determine temperature, humidity, proximity of other tracking devices, velocity, light, sound, and/or the like.

Figure 1A:
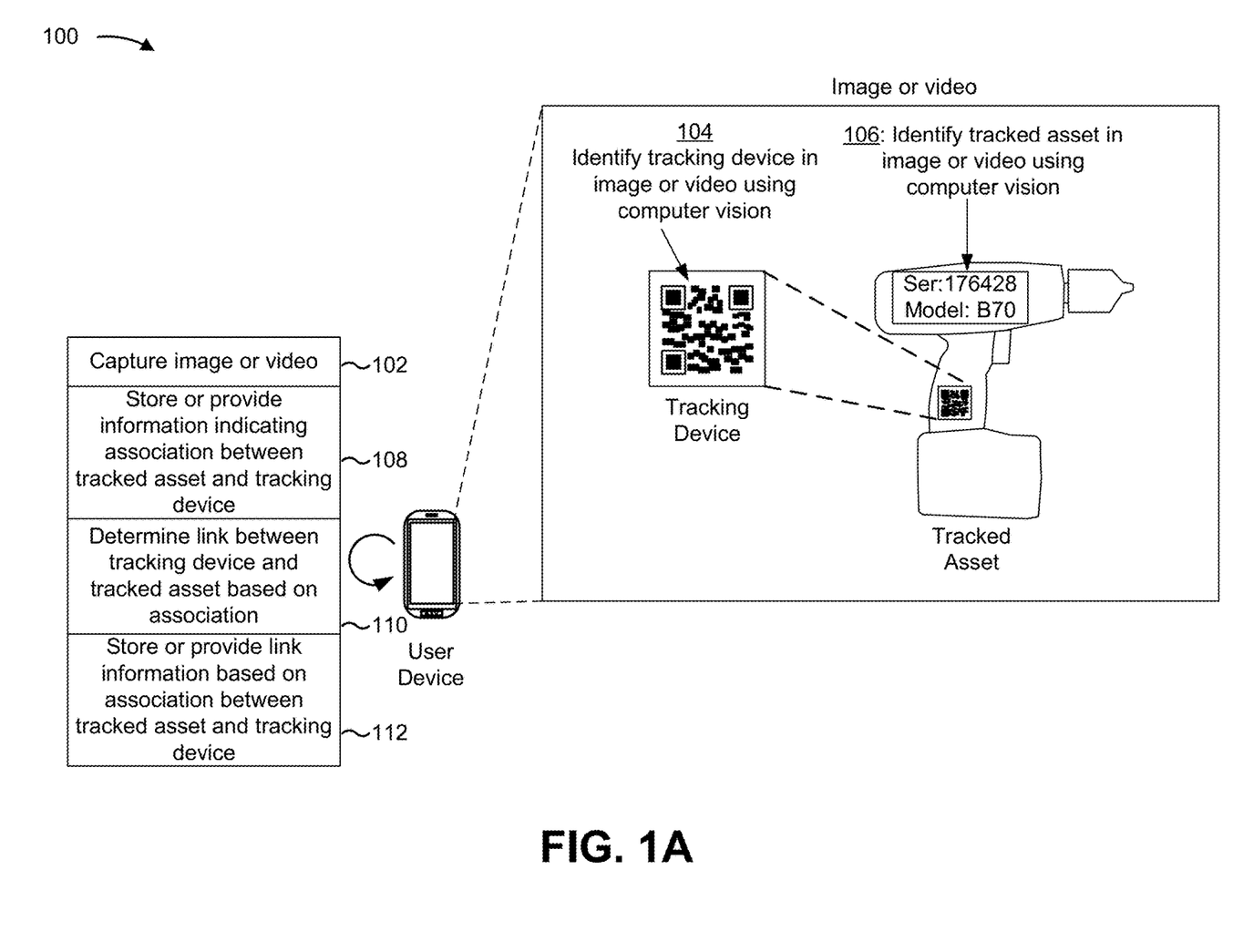
FIGS. 1A and 1B are diagrams of an example implementation described herein.
Figure 1B:
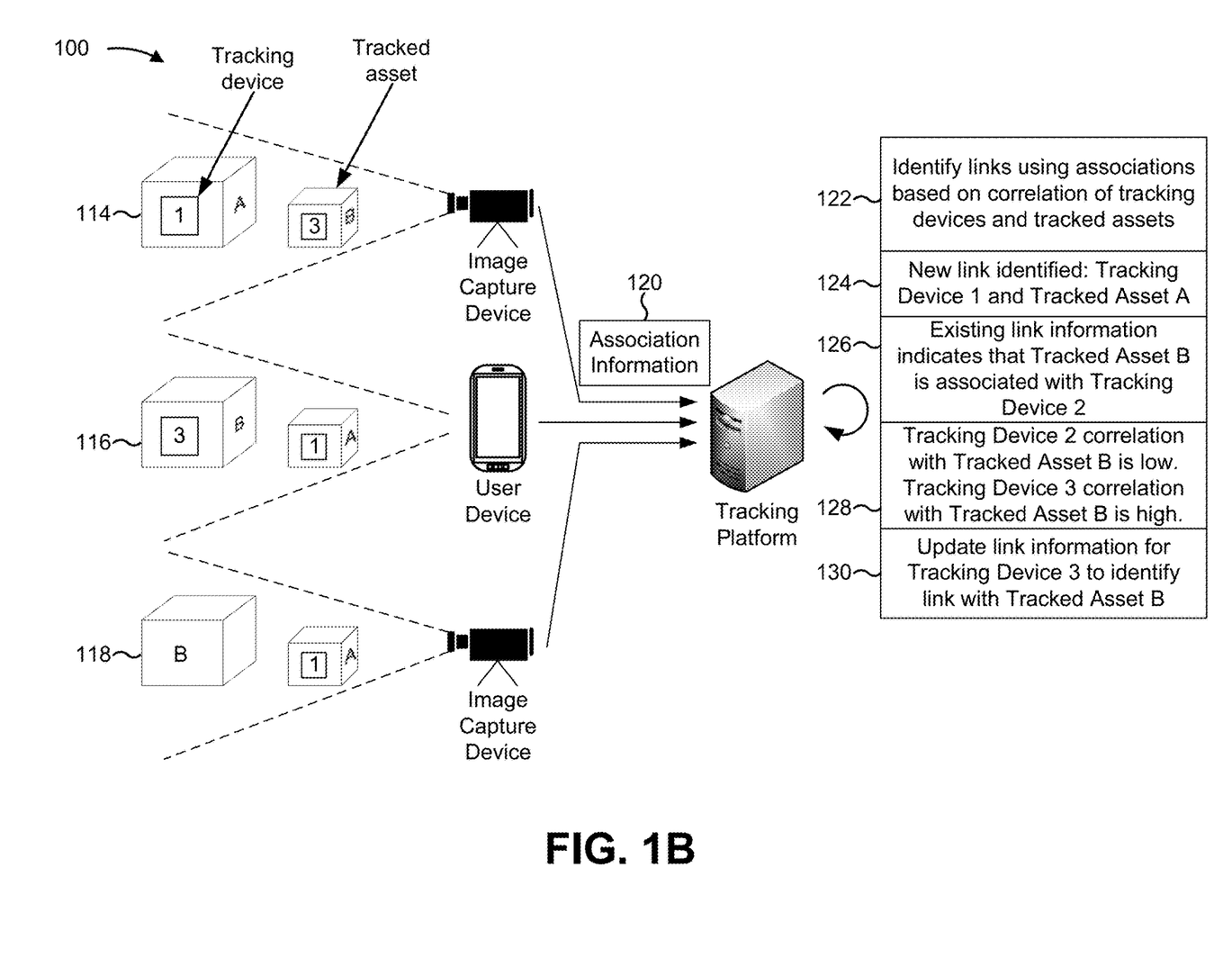

FIGS. 1A and 1B are diagrams of an example implementation 100 described herein. As shown, FIG. 1A shows a user device, a tracking device, and a tracked asset. The operations described in connection with FIG. 1A are primarily described as being performed by a user device. However, one or more of the operations described in connection with FIG. 1A can be performed by another device, such as a feature capture device or a tracking platform.

As shown in FIG. 1A, and by reference number 102, the user device can capture an image or video. The image or video is represented by the rectangular area to the right of the user device. In some implementations, the user device can capture the image or video using a camera of the user device. In some implementations, the user device can receive the image or video (e.g., from a feature capture device, another user device, and/or the like).

As shown, the image or video shows a tracking device and a tracked asset. Here, the tracked asset is a cordless drill with a serial number of 176428 and a model identifier of B70. In some implementations, the tracked asset can include any object with which a tracking device is to be linked. In some implementations, the tracking device can be affixed to the tracked asset. In some implementations, the tracking device might not be affixed to the tracked asset (e.g., can be placed next to the tracked asset for the purpose of linking the tracking device and the tracked asset). As shown, the tracking device can have a visual identifier (e.g., a Quick Response (QR) code on the tracking device, a barcode on the tracking device, etc.) that can enable the user device to identify the tracking device using a computer vision technique.

As shown by reference number 104, the user device can identify a tracking device in the image or video using computer vision. For example, the user device can identify the tracking device based on the visual identifier (e.g., the QR code) of the tracking device. In some implementations, the user device can identify an identifier of the tracking device using the visual identifier (e.g., the QR code can identify the identifier), and can store or provide information indicating the identifier. In some implementations, the identifier of the tracking device can be provided as an alphanumeric value, and the user device can determine the identifier by reading the alphanumeric value using the computer vision technique (e.g., using an optical character recognition technique). Providing the identifier using a visual identifier can enable more efficient identification of the identifier by the user device, whereas providing the identifier using an alphanumeric value can simplify verification of the identifier by a human actor.

In some implementations, the user device can identify the tracking device based on a radio signal of the tracking device (e.g., based on Bluetooth, WiFi, Zigbee, NFC, etc.). For example, the radio signal can provide information identifying the tracking device (e.g., an identifier of the tracking device, a network address of the tracking device, etc.). In some implementations, the user device can identify the tracking device based on an audio or light-based signal. In some implementations, the user device can identify the tracking device based on a pairing mode or a bind mode. For example, the user device can identify a tracking device that is in the pairing mode or the bind mode (e.g., based on a signal strength of the tracking device, based on proximity of the tracking device, etc.). In some implementations, the user device can identify the tracking device using a combination of a computer vision technique and a radio signal of the tracking device, thereby improving accuracy of the identification of the tracking device.

As shown by reference number 106, the user device can identify a tracked asset in the image or video using computer vision. In some implementations, the user device can identify an identifier of the tracked asset (e.g., the serial number, the model identifier, a brand name, etc.) using the computer vision technique. For example, the tracked asset can have a nameplate, as shown in FIG. 1A, or can include other information identifying the identifier of the tracked asset in an alphanumeric fashion. By identifying the tracked asset based on an alphanumeric identifier, the tracked asset can be identifiable without the use of an additional identifier (e.g., a visual identifier such as a QR code or a barcode). This can be particularly beneficial when the alphanumerical identifier is affixed to the tracked asset at the manufacturing stage (e.g., as part of a nameplate). In some implementations, the tracked asset can include a visual identifier that identifies the tracked asset (e.g., a QR code, a barcode, etc.), which can conserve processor resources of the user device that would otherwise be used to process an alphanumeric identifier.

In some implementations, the user device can determine an attribute (e.g., characteristic, parameter, etc.) of a tracked asset using a computer vision technique. For example, the user device can determine a device type (e.g., cordless drill, semi truck, iron, etc.), a brand name, a color, an age, a batch number, a model identifier, and/or the like. In some implementations, the user device can determine the attribute when identification of an identifier (e.g., a visual identifier, an alphanumeric identifier, etc.) has failed. For example, the user device can determine a confidence score for the determination of the identifier of the tracked asset. The confidence score can be based on a measure of certainty or confidence for the computer vision technique, such as a measure of clarity of the image or video used to determine the identifier, completeness of the identifier in the image, and/or the like. The confidence threshold can be a threshold value that, when satisfied by the confidence score, indicates that the determination of the identifier is to be trusted or is successful.

When the confidence threshold is not satisfied, the user device can determine one or more attributes of the tracked asset using the computer vision technique. The one or more attributes can be linked with the tracking device. For example, the user device can store or provide link information that indicates that a blue cordless drill with a brand name of Makita is associated with a particular tracking device. Thus, the user device can fall back to identification of attributes when visual identification of an identifier of a tracked asset is unsuccessful. This can be useful since the tracked asset can be identified even when the identifier is not visible or readable, and can enable a user to find the tracked asset and/or provide the identifier associated with the tracked asset based on the attributes.

In some implementations, the computer vision technique can be based on a model. The model can include, for example, a neural network or a similar type of model. The model can be used to identify a field of interest or a value of interest in the image or video. For example, the model can be used to identify a field of interest or value of interest for a serial number, a model identifier, and/or the like. In some implementations, the computer vision technique can include multiple, different techniques, such as a technique to identify a field of interest or value of interest and an optical character recognition technique to read an identifier associated with the field of interest or value of interest.

In some implementations, the model can be trained (e.g., using a supervised learning technique, an unsupervised learning technique, and/or the like). For example, a nameplate or other identifying information on the tracked asset can be at least partially standardized across many tracked assets. As a particular example, a given manufacturer or brand can use a consistent nameplate format across all products or a line of products associated with the given manufacturer or brand. The model can be trained using a machine learning technique based on a training set of nameplates and corresponding fields. Thus, accuracy of the model can be improved and human interaction required to identify the identifier of a tracked asset can be reduced. Furthermore, by training the model to identify tracked asset identifiers, likelihood of human error in identifying a tracked asset identifier can be reduced.

As shown by reference number 108, the user device can store or provide information indicating an association between the tracked asset and the tracking device. For example, the user device can determine an association, and can store or provide information indicating the association. In some implementations, the user device can determine the association based on identifying the tracking device and the tracked asset in the image or video. In some implementations, the user device can determine the association based on identifying that the tracking device and the tracked asset are within a threshold distance of each other (e.g., in a same part of the image, within a set number of pixels of each other, etc.). In some implementations, the user device can store or provide the information indicating the association based on a temporal proximity of identifying the tracking device and the tracked asset, or based on identifying the tracking device and the tracked asset contemporaneously. For example, the user device can determine an association when a tracked asset and a tracking device are identified within a particular time window in a video (e.g., within two seconds, within five seconds, within one minute, etc.). In some implementations, the user device can determine the association based on detecting the tracking device in a pairing mode or a bind mode and detecting the tracked asset in an image or video (e.g., within a particular time window of detecting the tracking device, etc.). In some implementations, the user device can determine the association based on detecting the tracking device in a pairing mode or bind mode and detecting the tracking device in an image or video with the tracked asset, thereby improving reliability of identification of the association by using radio-based detection and image-based detection.

As shown by reference number 110, the user device can determine a link between the tracking device and the tracked asset based on the association. For example, the link can indicate that the tracking device and the tracked asset have one or more associations. In some implementations, the user device can determine a link based on multiple, different associations. For example, the user device can determine a link after a tracking device and a tracked asset have been identified in a threshold number of images or videos or based on a correlation value associated with the tracking device and the tracked asset, as described in more detail below. In some implementations, the user device can determine a link based on a confidence value associated with an association, based on an association having been confirmed by a user, and/or the like. For a more detailed description of identifying a link, refer to the description of FIG. 1B, below.

As shown by reference number 112, the user device can store or provide link information based on the association. For example, the link information can identify the link. In some implementations, the user device can provide the link information to another device (e.g., a tracking platform, another user device, and/or the like). In some implementations, the user device can use the link information to identify a location of a tracked asset. For example, the user device or another device (e.g., a tracking platform, a feature capture device, etc.) can identify a tracking device at a location using a camera or another type of sensor, and can use the link information to determine that a corresponding tracked asset is at the location. In some implementations, the user device can use the link information to determine a metric associated with a tracked asset, such as a number of tracked assets at a location, utilization of a tracked asset or a type of tracked asset, a starting location and ending location of a tracked asset, an uptime or downtime of a tracked asset, and/or the like.

In some implementations, the user device can perform an action based on the link information, such as dispatching a technician or service employee to a location of a tracked asset, checking the tracked asset in or out of a system, providing the link information to a user for verification, dispatching a user to verify a tracked asset that is identified based on an attribute of the tracked asset and/or determine an identifier of the tracked asset, and/or the like. In this way, the user device can determine a link between a tracked asset and a tracking device based on an association between the tracked asset and the tracking device, and can perform an action based on the association. Thus, the user device can reduce the likelihood of erroneous linking of a tracking device and a tracked asset based on user error or incorrect pairing, and can reduce the overhead associated with linking a tracking device and a tracked asset in comparison to manual input.

As shown, FIG. 1B includes tracking devices, tracked assets, one or more feature capture devices, a user device, and a tracking platform. A tracking device is represented in FIG. 1B by a square on a side of a tracked asset, and is identified by a number. A tracked asset is represented in FIG. 1B by a three-dimensional box, and is identified by a letter.

As shown by reference number 114, a first image or video can include Tracking Device 1 and Tracked Asset A, as well as Tracking Device 3 and Tracked Asset B. As shown by reference number 116, a second image or video can include Tracking Device 1 and Tracked Asset A, as well as Tracking Device 3 and Tracked Asset B. As shown by reference number 118, a third image or video can include Tracked Asset B, and Tracking Device 3 might not be visible in the third image or video. Furthermore, the third image or video can include Tracked Asset A and Tracking Device 1. For example, Tracked Asset A and Tracked Asset B can move, over time, from a location of the first image or video, to a location of the second image or video, to a location of the third image or video. In some implementations, Tracked Asset A or Tracked Asset B may be captured by multiple, different cameras from different angles, and this may be used to identify the associations.

Note that multiple tracking devices and tracked assets can be identified in a single image or video. For example, multiple tracking devices can be simultaneously or contemporaneously identified in a single image or video. Thus, implementations described herein can be useful in situations where large numbers (e.g., tens, hundreds, thousands, etc.) of tracked assets can be visible, such as a warehouse, a store, a mail facility, and/or the like. Furthermore, it can be useful to situate a feature capture device or a user device at a location where tracked assets are likely to be located and/or pass through, such as on an assembly line, at an entrance/exit of a garage or warehouse, at a UAV docking location, and/or the like.

As shown by reference number 120, the feature capture device(s) and the user device(s) can provide association information to a tracking platform. In some implementations, a feature capture device or a user device can determine association information, thereby conserving resources of a tracking platform that would otherwise be used to determine the association information. For example, the first feature capture device can determine a first association between Tracking Device 1 and Tracked Asset A and a second association between Tracking Device 3 and Tracked Asset B, and can provide information indicating those associations to the tracking platform. In some implementations, an feature capture device or a user device can provide an image or video, and another device (e.g., a tracking platform, a user device, etc.) can determine association information based on the image or video, thereby conserving resources of the feature capture device or the user device that would otherwise be used to determine the association information. In some implementations, a feature capture device or a user device can provide information associated with a radio of the feature capture device or the user device, such as information indicating where and/or when a tracking device is detected. A recipient of the information associated with the radio (e.g., the tracking device, the user device, etc.) can use this information to determine associations between tracking devices and tracked assets, thereby conserving processor resources of the feature capture device or the user device that would otherwise be used to determine the associations.

In some implementations, the association information can identify a large number of associations (e.g., hundreds, thousands, or millions of associations, etc.). For example, feature capture devices or user devices can capture many images and/or videos, or can capture a stream of images and/or videos. The association information can identify associations between tracking devices and tracked assets in the many images and/or videos or the stream. Over time, many associations (e.g., hundreds, millions, billions, etc.) between tracking devices and tracked assets can be identified in this fashion. A statistical or correlative technique can be used to identify links between the tracking devices and the tracked assets based on the association information, as described in more detail below.

Notably, this enables the determination of link information without using a carefully arranged image or video of the tracked asset and the tracking device. For example, even if a tracked asset or a corresponding tracking device is not identified in all images or videos, the tracking platform can nevertheless identify a link between the tracked asset and the corresponding tracking device using the statistical or correlative technique based on several associations between the tracked asset and the corresponding tracking device. Thus, a tracking device can be affixed to a tracked asset, and the tracked asset can be deployed into use, without a priori configuration of the link information. The link information can be determined "on the fly" using the association information from the feature capture devices and/or the user devices. Thus, a setup stage for the link information can be skipped, thereby conserving processor resources of the user device and/or the tracking platform and reducing human intervention and time investment in the process of determining link information.

An example of association information is provided in the table below. In the table, the leftmost column identifies image indexes of a set of images, the center column indicates whether a particular tracking device (Tracking Device X) is included in each image of the set of images, and the right column indicates whether a particular tracked asset (Tracked Asset Y) is included in each image of the set of images. This example of association information is not based on the values provided in FIG. 1A or 1B.

| Image | Tracking Device X | Tracked Asset Y |
| --- | --- | --- |
| 1 | 1 | 1 |
| 2 | 1 | 0 |
| 3 | 0 | 1 |
| 4 | 1 | 1 |
| 5 | 1 | 1 |
| 6 | 1 | 1 |

As can be seen in the above table, Tracking Device X and Tracked Asset Y are identified in 4 out of the 6 images. In this example, the tracking platform can identify associations for the 4 out of the 6 images, since Tracking Device X and Tracked Asset Y are identified in the 4 out of the 6 images. More complex approaches for identifying associations are described elsewhere herein and are also contemplated. The above is provided merely as an example.

As shown by reference number 122, the tracking platform can identify links (e.g., link information) using the association information. In some implementations, the tracking platform can identify the links based on correlation values of the tracking devices and the tracked assets. For example, the tracking platform can identify links between the tracking devices and the tracked assets. The tracking platform can use a statistical or correlative technique to identify the links. For example, even if a tracking device is affixed to a tracked asset, the tracking device and the tracked asset might not be identified in every image or video due to failure of a computer vision technique, due to failure to detect the tracking device, and/or the like. By using the statistical or correlative technique based on correlation values, the tracking platform can identify links without perfect image or video data, thereby enabling the usage of the implementations described herein in the field without carefully composed images or videos.

In some implementations, the correlation value can be a threshold value. For example, the correlation value can indicate that a link is to be identified when a tracking device and a tracked asset are associated with a threshold number of associations or a threshold ratio of associations. Continuing the example with reference to the above table, the tracking platform can identify a link when at least 3 of the 6 images include Tracking Device X and Tracked Asset Y, or when a threshold number of images that include Tracking Device X or Tracked Asset Y include Tracking Device X and Tracked Asset Y. As another example, the correlation value can indicate that the link is to be identified when a tracking device and a tracked asset are associated with more associations with each other than with any other tracking device or tracked asset. As yet another example, the correlation value can be based on a statistical value, such as an R value and/or the like. For example, when the statistical value satisfies a threshold with regard to the tracking device and the tracked asset (e.g., indicating a threshold level of confidence with regard to the link between the tracking device and the tracked asset), then the tracking platform can identify a link between the tracking device and the tracked asset.

In some implementations, the tracking platform can identify a link based on a user input. For example, the tracking platform may provide, for display for a user, information identifying a tracked asset and one or more possible links associated with the tracked asset. As another example, the tracking platform may provide, for display to the user, information identifying a tracking device and one or more possible links associated with the tracking device. The tracking platform can receive input indicating which link, of the possible links, is to be used. Thus, the tracking platform can identify a link based on a user input, thereby reducing uncertainty in situations when multiple links are possible.

As shown by reference number 124, the tracking platform can identify a link between Tracking Device 1 and Tracked Asset A. In some implementations, the tracking platform can identify the link based on the association information regarding Tracking Device 1 and Tracked Asset A satisfying a threshold, as described in more detail above. As shown, this link can be a new link, indicating that Tracking Device 1 and Tracked Asset A were not previously associated with a link. In other words, the tracking platform can identify the link on the fly without a setup procedure to capture an image of Tracking Device 1 and Tracked Asset A, thereby conserving time and processor resources, and reducing error, that would otherwise be introduced or used for the setup procedure. Furthermore, the determination of new link information based on association information from feature capture devices and/or user devices can enable the determination of links for numbers of tracked assets that would be difficult or impossible for a human actor to process, such as thousands of tracked assets, millions of tracked assets, and so on.

As shown by reference number 126, existing link information can indicate that Tracked Asset B is associated with Tracking Device 2 (not Tracking Device 3, which is identified in the first and second images or videos). It can be seen in FIG. 1B that Tracking Device 3 is associated with (e.g., affixed to) Tracked Asset B. Thus, the existing link information is erroneous. This can be due to user error (e.g., a user can have incorrectly input the existing link information), an erroneous determination of link information (e.g., based on a false positive link between Tracked Asset B and Tracking Device 2), a user action (e.g., removing Tracking Device 3 from Tracked Asset B and affixing Tracking Device 2 to Tracked Asset B), and/or the like.

As shown by reference number 128, the tracking platform can determine that a correlation value of Tracking Device 2 and Tracked Asset B is low, and that a correlation value of Tracking Device 3 and Tracked Asset B is high. For example, the tracking platform can determine, based on the association information, that the existing link information is associated with a lower correlation value than a potential link between Tracking Device 3 and Tracked Asset B. In some implementations, the tracking platform can determine that the existing link information does not satisfy a threshold (e.g., one or more of the thresholds described above with regard to the correlation value), and can determine that the potential link satisfies the threshold. In some implementations, the tracking platform can determine that the existing link information does not satisfy a first threshold and that the potential link satisfies a second threshold that is higher than the first threshold.

As shown by reference number 130, the tracking platform can update the link information for Tracking Device 3 to identify a link with Tracked Asset B. For example, the tracking platform can update the link information to identify the potential link between Tracking Device 3 and Tracked Asset B. Thus, the tracking platform can correct or update link information, thereby improving accuracy of link information and reducing user participation in the determination of link information. Furthermore, this dynamic updating of link information can be performed on a scale that is impossible for a human actor to perform effectively, such as for thousands of tracked assets, millions of tracked assets, and so on.

In some implementations, the tracking platform can perform an action based on the link information. For example, the tracking platform may deploy an autonomous device (e.g., a robot, a drone, etc.) to pick up or retrieve a particular tracked asset and deliver the particular tracked asset to a location. This may be useful in a warehouse context, wherein a purchased item may be carried to a delivery portal or delivered to a recipient. As another example, the tracking platform may cause a resource to be deployed to a particular location based on the link information. For example, the tracking platform may identify a set of tracked assets at the particular location, and may cause a resource to be deployed that can be used for the set of tracked assets. This may be useful, for example, for a set of power tools, which may require consumable parts, battery packs, and/or the like.

As indicated above, FIGS. 1A and 1B are provided as examples. Other examples are can differ from what is described with regard to FIGS. 1A and 1B.

Figure 2:
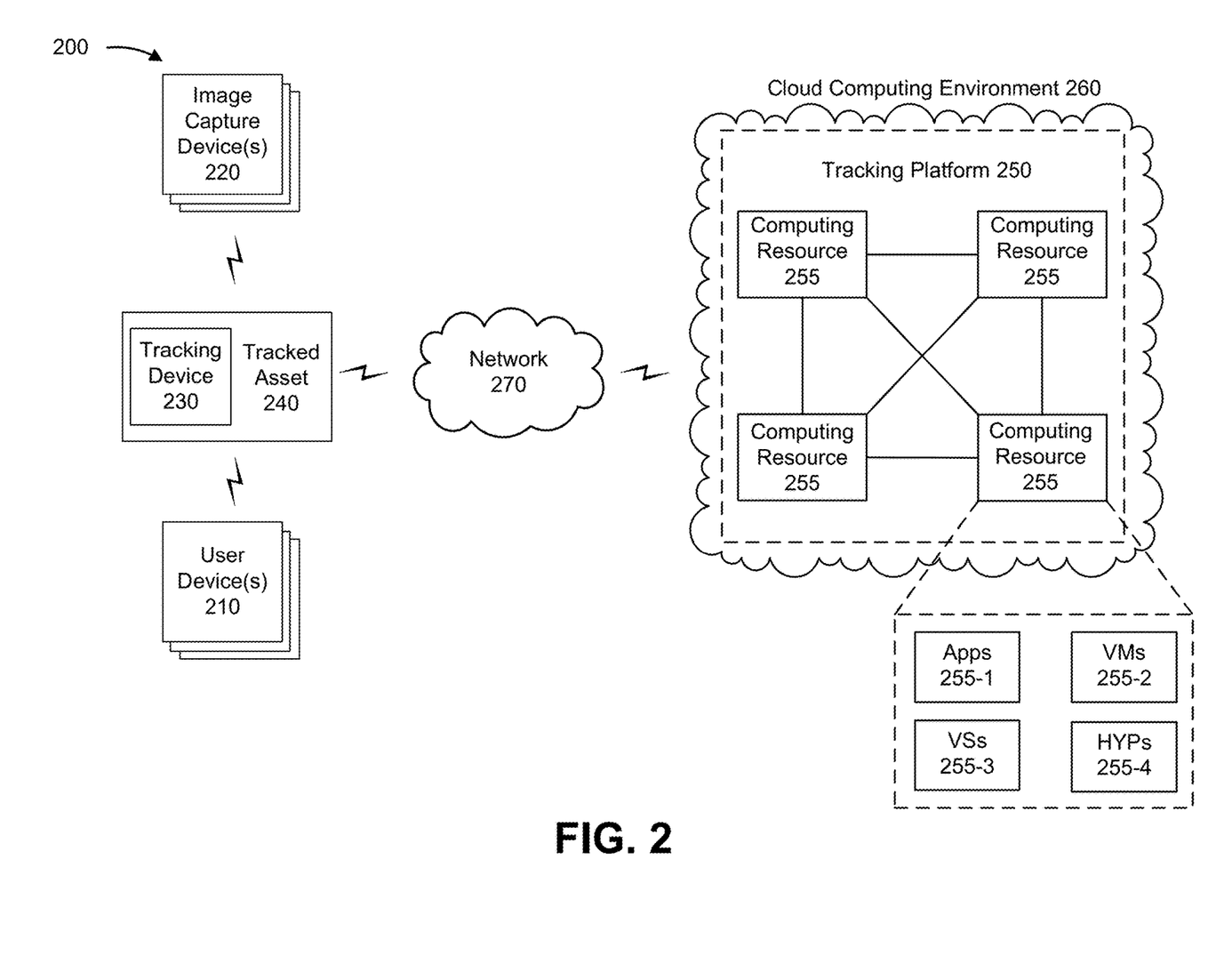
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a user device 210, a feature capture device 220, a tracking device 230, a tracked asset 240, a tracking platform 250, a computing resource 255, a cloud computing environment 260, and/or a network 270. Devices of environment 200 can interconnect via wired connections, wireless connections, or a combination of wired and wireless connections.

User device 210 includes one or more devices capable of receiving, generating, storing, processing, and/or providing information associated a tracking device with a tracked asset. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can include a camera capable of capturing an image or video. In some implementations, user device 210 can include one or more radios associated with a radio access technology, such as Bluetooth, NFC, Zigbee, WiFi, and/or the like.

Feature capture device 220 includes a device capable of capturing, storing, processing, and/or providing identifying features of tracking device 230 and/or tracked asset 240. For example, feature capture device 220 can include a camera, an image sensor, a radio, and/or the like. In some implementations, feature capture device 220 can include one or more radios associated with a radio access technology, such as Bluetooth, NFC, Zigbee, WiFi, and/or the like. In some implementations, feature capture device 220 may include a light sensor, a humidity sensor, a sound sensor, a temperature sensor, and/or the like. This information may be used in addition to or as an alternative to radio information or image information to identify a link between tracking device 230 and tracked asset 240.

Tracking device 230 includes a device used to determine a location of tracked asset 240. For example, tracking device 230 can include a near-field communication (NFC) tag, a Global Positioning System (GPS)-based tracking device, a Bluetooth-based tracking device, and/or the like. In some implementations, tracking device 230 can have one or more identifiers, such as a network address, a serial number, a visual identifier affixed to tracking device 230, and/or the like. In some implementations, tracking device 230 can be affixable to tracked asset 240 (e.g., using an adhesive, a keychain, a loop, etc.). In some implementations, tracking device 230 may include another component to produce a detectable signal, such as a speaker, a light-emitting component (e.g., a light-emitting diode, a bulb, etc.), and/or the like. In some implementations, tracking device 230 may include a light sensor, a humidity sensor, a sound sensor, a temperature sensor, and/or the like. Information captured by one or more of these sensors may be used in addition to or as an alternative to radio information or image information to identify a link between tracking device 230 and tracked asset 240.

Tracked asset 240 includes any object that is to be tracked using tracking device 230. For example, tracked asset 240 can include a tool, a vehicle, a worker, an animal, an unmanned aerial vehicle (UAV), store inventory, and/or the like. In some implementations, tracked asset 240 can be associated with one or more identifiers and/or attributes that can be used to identify tracked asset 240. In some implementations, tracking device 230 and tracked asset 240 may be integrated at the manufacturing stage. For example, a manufacturer may affix tracking device 230 to tracked asset 240.

Tracking platform 250 includes one or more computing resources assigned to determine association information and/or link information for tracking devices 230 and tracked assets 240. For example, tracking platform 250 can be a platform implemented by cloud computing environment 260. In some implementations, tracking platform 250 is implemented by computing resources 255 of cloud computing environment 260.

Tracking platform 250 can include a server device or a group of server devices. In some implementations, tracking platform 250 can be hosted in cloud computing environment 260. Notably, while implementations described herein describe tracking platform 250 as being hosted in cloud computing environment 260, in some implementations, tracking platform 250 might not be cloud-based or can be partially cloud-based.

Cloud computing environment 260 includes an environment that delivers computing as a service, whereby shared resources, services, etc. can be provided to tracking platform 250. Cloud computing environment 260 can provide computation, software, data access, storage, and/or other services that do not require end-user knowledge of a physical location and configuration of a system and/or a device that delivers the services. As shown, cloud computing environment 260 can include tracking platform 250 and/or computing resource 255.

Computing resource 255 includes one or more personal computers, workstation computers, server devices, and/or another type of computation and/or communication device. In some implementations, computing resource 255 can host tracking platform 250. The cloud resources can include compute instances executing in computing resource 255, storage devices provided in computing resource 255, data transfer devices provided by computing resource 255, etc. In some implementations, computing resource 255 can communicate with other computing resources 255 via wired connections, wireless connections, or a combination of wired and wireless connections.

As further shown in FIG. 2, computing resource 255 can include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that can be provided to or accessed by user device 210. Application 255-1 can eliminate a need to install and execute the software applications on user device 210. For example, application 255-1 can include software associated with tracking platform 250 and/or any other software capable of being provided via cloud computing environment 260. In some implementations, one application 255-1 can send/receive information to/from one or more other applications 255-1, via virtual machine 255-2.

Virtual machine 255-2 includes a software implementation of a machine (e.g., a computer) that executes programs like a physical machine. Virtual machine 255-2 can be either a system virtual machine or a process virtual machine, depending upon use and degree of correspondence to any real machine by virtual machine 255-2. A system virtual machine can provide a complete system platform that supports execution of a complete operating system. A process virtual machine can execute a single program, and can support a single process. In some implementations, virtual machine 255-2 can execute on behalf of a user (e.g., user device 210), and can manage infrastructure of cloud computing environment 260, such as data management, synchronization, or long-duration data transfers.

Virtualized storage 255-3 includes one or more storage systems and/or one or more devices that use virtualization techniques within the storage systems or devices of computing resource 255. In some implementations, within the context of a storage system, types of virtualizations can include block virtualization and/or file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 can present a virtual operating platform to the guest operating systems, and can manage the execution of the guest operating systems. Multiple instances of a variety of operating systems can share virtualized hardware resources.

Network 270 includes one or more wired and/or wireless networks. For example, network 270 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
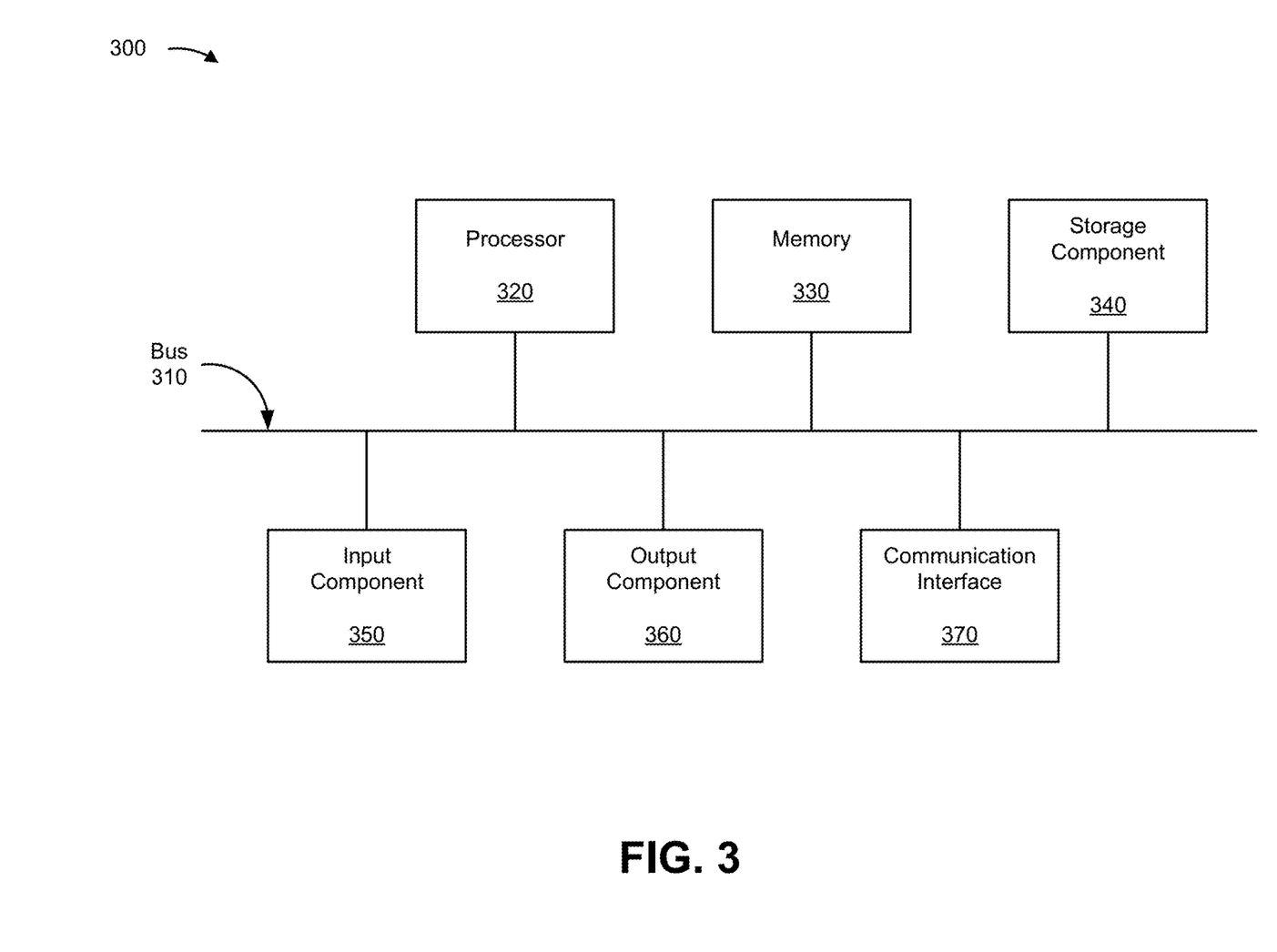
FIG. 3 is a diagram of example components of one or more devices of FIG. 2.

FIG. 3 is a diagram of example components of a device 300. Device 300 can correspond to user device 210, feature capture device 220, tracking device 230, tracked asset 240, tracking platform 250, and/or computing resource 255. In some implementations user device 210, feature capture device 220, tracking device 230, tracked asset 240, tracking platform 250, and/or computing resource 255 can include one or more devices 300 and/or one or more components of device 300. As shown in FIG. 3, device 300 can include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320. In some implementations, memory 330 includes one or more memories.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and/or software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
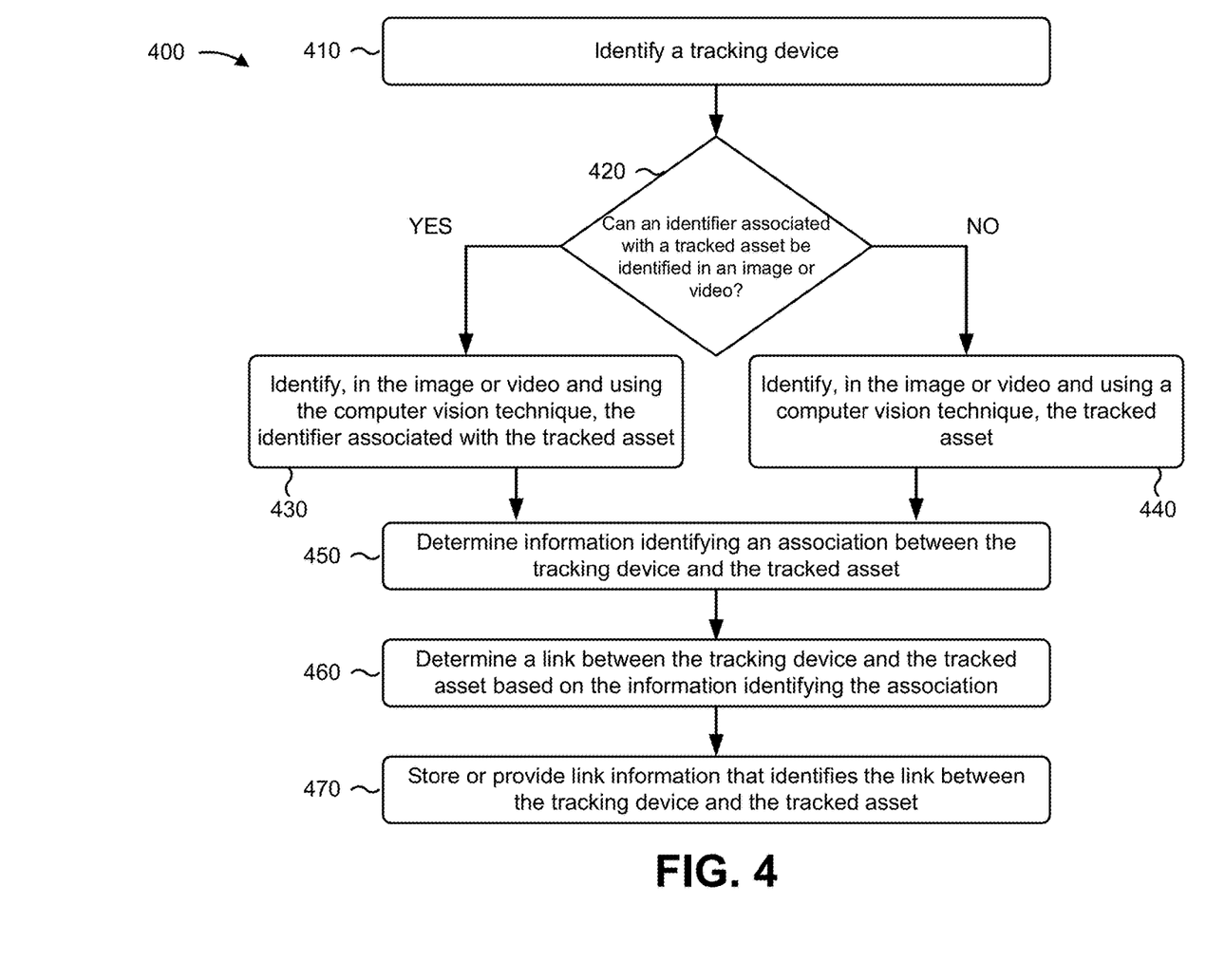
FIG. 4 is a flow chart of an example process for image-based association of tracking devices and tracked assets.

FIG. 4 is a flow chart of an example process 400 for image-based association of tracking devices and tracked assets. In some implementations, one or more process blocks of FIG. 4 can be performed by a tracking platform (e.g., tracking platform 250). In some implementations, one or more process blocks of FIG. 4 can be performed by another device or a group of devices separate from or including the tracking platform, such as a user device (e.g., user device 210), an feature capture device (e.g., feature capture device 220), a tracking device (e.g., tracking device 230), a tracked asset (e.g., tracked asset 240).

As shown in FIG. 4, process 400 can include identifying a tracking device (block 410). For example, the tracking platform (e.g., using processor 320, input component 350, communication interface 370, and/or the like) can identify a tracking device, as described above. In some implementations, the tracking platform can identify the tracking device in the image or video and using the computer vision technique, wherein determining the link (described below) is based on identifying the tracking device and the tracked asset or the identifier in a same image or video.

As further shown in FIG. 4, process 400 can include determining whether an identifier associated with a tracked device can be identified in an image or video (block 420). When the identifier associated with the tracked device can be identified in the image or video (block 420—YES), then process 400 can include identifying, in the image or video and using a computer vision technique, the identifier associated with the tracked asset (block 430). When the identifier associated with the tracked device cannot be identified in the image or video (block 420—NO), then process 400 can include identifying, in the image or video and using a computer vision technique, the tracked asset (block 440). For example, the tracking platform (e.g., using processor 320, input component 350, communication interface 370, and/or the like) can identify, in an image or video and using a computer vision technique, a tracked asset or an identifier associated with the tracked asset, as described above. In some implementations, the tracking device is to be used to track a location of the tracked asset or to track other information associated with the tracked asset. In some implementations, the tracking platform can identify a tracked asset (e.g., an attribute of a tracked asset) when the tracking platform fails to identify an identifier associated with the tracked asset.

As further shown in FIG. 4, process 400 can include determining information identifying an association between the tracking device and the tracked asset (block 450). For example, the tracking platform (e.g., using processor 320, input component 350, communication interface 370, and/or the like) can determine information identifying an association between the tracking device and the tracked asset, as described above. In some implementations, the information identifying the association is determined based on identifying the tracking device and identifying, in the image or video and using the computer vision technique, the tracked asset or the identifier associated with the tracked asset.

As further shown in FIG. 4, process 400 can include determining a link between the tracking device and the tracked asset based on the information identifying the association (block 460). For example, the tracking platform (e.g., using processor 320, input component 350, communication interface 370, and/or the like) can determine a link between the tracking device and the tracked asset based on the information identifying the association, as described above. In some implementations, the tracking platform can determine the link based on multiple, different associations between the tracking device and the tracked asset, wherein the multiple, different associations are based on identifying the tracking device and the tracked asset on multiple, different occasions. In some implementations, the tracking device can determine the link based on a correlation value associated with the tracking device and the tracked asset, wherein the correlation value is based on the multiple, different associations.

As further shown in FIG. 4, process 400 can include storing or providing link information that identifies the link between the tracking device and the tracked asset (block 470). For example, the tracking platform (e.g., using processor 320, input component 350, output component 360, communication interface 370, and/or the like) can store or provide link information that identifies the link between the tracking device and the tracked asset, as described above. In some implementations, the tracking platform can store or provide link information that identifies the link between the tracking device and the tracked asset to track the location of the tracked asset using the tracking device.

Process 400 can include additional implementations, such as any single implementation or any combination of implementations described below and/or in connection with one or more other processes described elsewhere herein.

In some implementations, the tracking platform can determine other links between a plurality of tracking devices and respective tracked assets based on information identifying associations between the plurality of tracking devices and the respective tracked assets. In some implementations, the tracking platform can determine that the identification of the identifier of the tracked asset does not satisfy a confidence threshold, and can identify the tracked asset based on an attribute of the tracked asset and based on determining that the identification of the identifier of the tracked asset does not satisfy the confidence threshold. In some implementations, a device (e.g., the tracking platform, a user device, an feature capture device, etc.) can capture the image or video using a camera of the device.

In some cases, the tracking platform can identify an asset (e.g., a tracked asset or another asset) based on an externally visible characteristic (e.g., a visual identifier, etc.). In some implementations, the asset might not be externally identifiable. The tracking platform can determine whether the identified asset is associated with a link to a tracking device. In the case when the identified asset is associated with a tracking device, the tracking platform may attempt to identify the tracking device. In this case, the tracking platform may determine whether the link is correct based on whether the tracking device can be identified, may determine whether the tracking device has failed based on whether the tracking device can be identified, and/or the like. In this way, the tracking platform may determine a status of a tracking device based on detecting an asset.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations may be made in light of the above disclosure or can be acquired from practice of the implementations.

As used herein, the term "component" is intended to be broadly construed as hardware, firmware, and/or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like, depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods does not limit the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   identify a tracking device,
      wherein the tracking device is associated with a tracked asset and an identifier associated with the tracked asset;
   determine that identification of the identifier associated with the tracked asset does not satisfy a confidence threshold;
   identify, in an image or video and using a computer vision technique, the tracked asset based on an attribute of the tracked asset and based on determining that the identification of the identifier of the tracked asset does not satisfy the confidence threshold;
   determine information identifying an association between the tracking device and the tracked asset,
      wherein the information identifying the association is determined based on identifying the tracking device and identifying, in the image or video and using the computer vision technique, the tracked asset or the identifier associated with the tracked asset;
   determine a link between the tracking device and the tracked asset based on a correlation value associated with the tracking device and the tracked asset,
      wherein the correlation value is based on multiple, different associations;
   determine that the link satisfies a threshold of one or more thresholds associated with the correlation value; and
   store or provide, based on determining that the link satisfies the threshold, link information that identifies the link between the tracking device and the tracked asset.

2. The device of claim 1, wherein the one or more processors, when identifying the tracking device, are further to:
   identify the tracking device in the image or video and using the computer vision technique,
      wherein determining the link is based on identifying the tracking device and the tracked asset or the identifier in a same image or video.

3. The device of claim 1, wherein the one or more processors, when determining the link, are further to:
   determine the link based on the multiple, different associations between the tracking device and the tracked asset,
      wherein the multiple, different associations are based on identifying the tracking device and the tracked asset on multiple, different occasions.

4. The device of claim 1, wherein the one or more processors are further to:
   determine other links between a plurality of tracking devices and respective tracked assets based on information identifying associations between the plurality of tracking devices and the respective tracked assets.

5. The device of claim 1, where the one or more processors are further to:
   capture the image or video using a camera of the device.

6. The device of claim 1, wherein the one or more processors are further to:
   identify the tracking device based on at least one of:
      an audio signal, or
      a light signal.

7. The device of claim 1, wherein the tracking device includes a visual identifier,
   wherein the visual identifier includes one or more of:
      a Quick Response (QR) code, or
      a barcode.

8. A non-transitory computer-readable medium storing instructions, the instructions comprising:
   one or more instructions that, when executed by one or more processors of a device, cause the one or more processors to:
   identify a tracking device,
      wherein the tracking device is associated with a tracked asset and an identifier associated with the tracked asset;
   determine that identification of the identifier associated with the tracked asset does not satisfy a confidence threshold;
   identify, in an image or video and using a computer vision technique, the tracked asset based on an attribute of the tracked asset and based on determining that the identification of the identifier of the tracked asset does not satisfy the confidence threshold;
   determine information identifying an association between the tracking device and the tracked asset,
      wherein the information identifying the association is determined based on identifying the tracking device and identifying, in the image or video and using the computer vision technique, the tracked asset or the identifier associated with the tracked asset;

determine a link between the tracking device and the tracked asset on a correlation value associated with the tracking device and the tracked asset,
   wherein the correlation value is based on multiple, different associations;
determine that the link satisfies a threshold of one or more thresholds associated with the correlation value; and
store or provide, based on determining that the link satisfies the threshold, link information that identifies the link between the tracking device and the tracked asset.

9. The non-transitory computer-readable medium of claim 8, wherein the one or more instructions, that cause the one or more processors to identify the tracking device, cause the one or more processors to:
identify the tracking device in the image or video using the computer vision technique,
   wherein determining the link is based on identifying the tracking device and the tracked asset or the identifier in a same image or video.

10. The non-transitory computer-readable medium of claim 8, wherein the one or more instructions, that cause the one or more processors to determine the link, cause the one or more processors to:
determine the link based on the multiple, different associations between the tracking device and the tracked asset,
   wherein the multiple, different associations are based on identifying the tracking device and the tracked asset on multiple, different occasions.

11. The non-transitory computer-readable medium of claim 8, wherein the one or more instructions, when executed by the one or more processors, cause the one or more processors to:
determine other links between a plurality of tracking devices and respective tracked assets based on information identifying associations between the plurality of tracking devices and the respective tracked assets.

12. The non-transitory computer-readable medium of claim 8, where the one or more instructions, when executed by the one or more processors, cause the one or more processors to:
capture the image or video using a camera of the device.

13. The non-transitory computer-readable medium of claim 8, where the one or more instructions, when executed by the one or more processors, further cause the one or more processors to:
identify the tracking device based on at least one of:
   an audio signal, or
   a light signal.

14. The non-transitory computer-readable medium of claim 8, wherein the tracking device includes a visual identifier,
   wherein the visual identifier includes one or more of:
      a Quick Response (QR) code, or
      a barcode.

15. A method, comprising:
identifying, by a device, a tracking device,
   wherein the tracking device is associated with a tracked asset and an identifier associated with the tracked asset;
determining, by the device, that identification of the identifier associated with the tracked asset does not satisfy a confidence threshold;
identifying, by the device and in an image or video and using a computer vision technique, the tracked asset based on an attribute of the tracked asset and based on determining that the identification of the identifier of the tracked asset does not satisfy the confidence threshold;
determining, by the device, information identifying an association between the tracking device and the tracked asset,
   wherein the information identifying the association is determined based on identifying the tracking device and identifying, in the image or video and using the computer vision technique, the tracked asset or the identifier associated with the tracked asset;
determining, by the device, a link between the tracking device and the tracked asset based on a correlation value associated with the tracking device and the tracked asset,
   wherein the correlation value is based on multiple, different associations;
determining, by the device, that the link satisfies a threshold of one or more thresholds associated with the correlation value; and
storing or providing, by the device and based on determining that the link satisfies the threshold, link information that identifies the link between the tracking device and the tracked asset.

16. The method of claim 15, further comprising:
identifying the tracking device in the image or video and using the computer vision technique,
   wherein determining the link is based on identifying the tracking device and the tracked asset or the identifier in a same image or video.

17. The method of claim 15, wherein determining the link comprises:
determining the link based on the multiple, different associations between the tracking device and the tracked asset,
   wherein the multiple, different associations are based on identifying the tracking device and the tracked asset on multiple, different occasions.

18. The method of claim 15, further comprising:
determining other links between a plurality of tracking devices and respective tracked assets based on information identifying associations between the plurality of tracking devices and the respective tracked assets.

19. The method of claim 15, further comprising
identifying the tracking device based on at least one of:
   an audio signal, or
   a light signal.

20. The method of claim 15, wherein the tracking device includes a visual identifier,
   wherein the visual identifier includes one or more of:
      a Quick Response (QR) code, or
      a barcode.

* * * * *